United States Patent [19]

Ando et al.

[11] Patent Number: 5,427,408
[45] Date of Patent: Jun. 27, 1995

[54] AIR BAG DEVICE AND METHOD OF MOLDING A PAD PORTION THEREOF

[75] Inventors: Masao Ando; Hisao Hanabusa; Yuuji Kuriyama; Kazumi Ichimaru, all of Nakashima, Japan

[73] Assignee: Toyoda Gosei Co., Ltd., Nishikasugai, Japan

[21] Appl. No.: 97,749

[22] Filed: Jul. 28, 1993

Related U.S. Application Data

[63] Continuation-in-part of Ser. No. 974,726, Nov. 13, 1992, Pat. No. 5,335,939.

[30] Foreign Application Priority Data

| Nov. 13, 1991 | [JP] | Japan | 3-297356 |
| Dec. 13, 1991 | [JP] | Japan | 3-330503 |
| Jan. 20, 1992 | [JP] | Japan | 4-1472 |
| Jul. 30, 1992 | [JP] | Japan | 4-204074 |

[51] Int. Cl.⁶ .............................. B60R 21/16
[52] U.S. Cl. .................... 280/728.3; 264/275
[58] Field of Search ............ 280/728 B, 728 R, 731, 280/732; 264/275

[56] References Cited

U.S. PATENT DOCUMENTS

| 4,327,937 | 5/1982 | Scholz et al. | 280/728 B |
| 4,842,299 | 6/1989 | Okamura et al. | 280/728 B |
| 4,893,833 | 1/1990 | DiSalvo et al. | 280/728 B |
| 5,066,037 | 11/1991 | Castrigno et al. | 280/728 B |
| 5,096,220 | 3/1992 | Nakajima | 280/728 B |
| 5,096,221 | 3/1992 | Combs et al. | |
| 5,158,322 | 10/1992 | Sun | 280/732 |
| 5,203,586 | 4/1993 | Niwa et al. | 280/728 B |
| 5,209,519 | 5/1993 | Shiga et al. | 280/728 |

FOREIGN PATENT DOCUMENTS

| 4128945 | 4/1992 | Germany | 280/728 B |
| 63-111353 | 7/1988 | Japan . | |

*Primary Examiner*—Mitchell J. Hill
*Assistant Examiner*—Paul N. Dickson
*Attorney, Agent, or Firm*—Cushman, Darby & Cushman

[57] ABSTRACT

A process is provided for molding a pad for an air bag device. The pad has a cover portion, a hinge portion disposed near one edge thereof, and a bracket portion extending from the hinge portion at an angle with respect to the cover portion. The pad is provided with a flexible reinforcing insert embedded therein, extending from the bracket portion to the cover portion through the hinge portion. The insert is set in a mold, while the mold is open, so that the insert may be held in position by pins projecting from the mold into that portion of a mold cavity which forms the bracket portion of the pad. After the mold is closed, a molding material is injected into the mold cavity through a gate connected to that edge of the cavity which forms the one edge of the cover portion of the pad. A pad formed by the process is also provided.

5 Claims, 7 Drawing Sheets

AIR BAG DEVICE AND METHOD OF MOLDING A PAD PORTION THEREOF

This application is a continuation-in-part of U.S. application No. 07/974,726 filed Nov. 13, 1992, now U.S. Pat. No. 5,335,939.

BACKGROUND OF THE INVENTION

1. Field of the Invention

This invention relates to an air bag device. More particularly, this invention relates to an air bag device being equipped in a vehicle instrument panel, and to a method for molding a pad of the air bag device.

2. Description of Related Art

A cover or pad of an air bag device is generally fixed to an opening for an instrument panel, and has a hinge or a break-away portion as described, for example, in U.S. Pat. No. 5,096,221 and Japanese Utility Model JIKKAISHO 63-111353.

However, by use of the hinge or break-away portion, the number of composite parts increases, and it requires much time and labor to install these parts to the cover.

Figure 5:
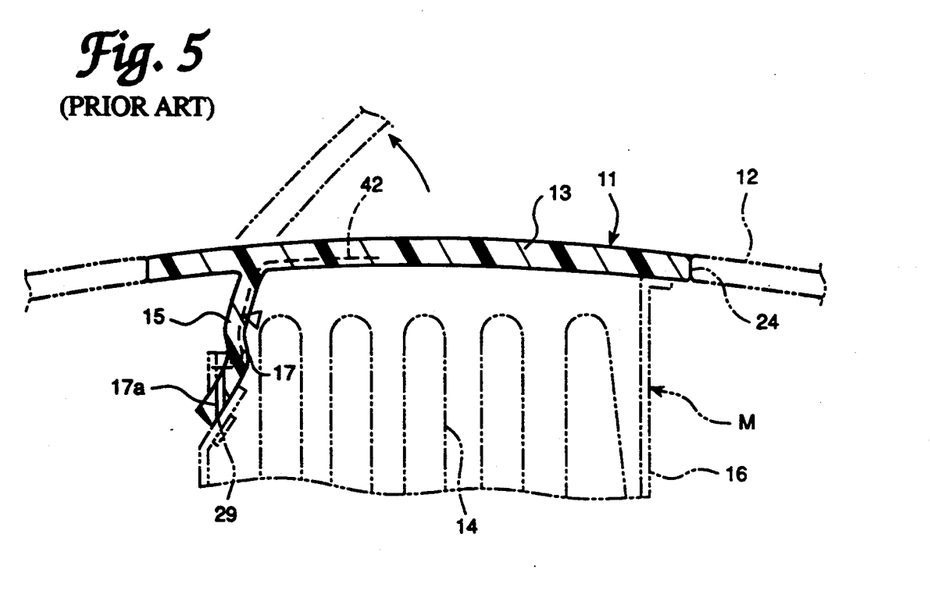
FIG. 5 is a cross-sectional view of a conventional pad molded employed in an air bag device.

A conventional air bag device, constructed and installed, is shown schematically by way of example in FIG. 5 of the accompanying drawings. The air bag device M is installed in an instrument panel 12 in front of the passenger seat in an automobile. The device M comprises an inflatable air bag 14, a rotatable pad 11 normally fitted in an opening 24 in the instrument panel 12 and covering the air bag 14, a case 16 holding the air bag 14 and the pad 11, and an inflator not shown, but provided in the case 16 for supplying gas into the air bag 14 to inflate it.

SUMMARY OF THE INVENTION

Figure 6:
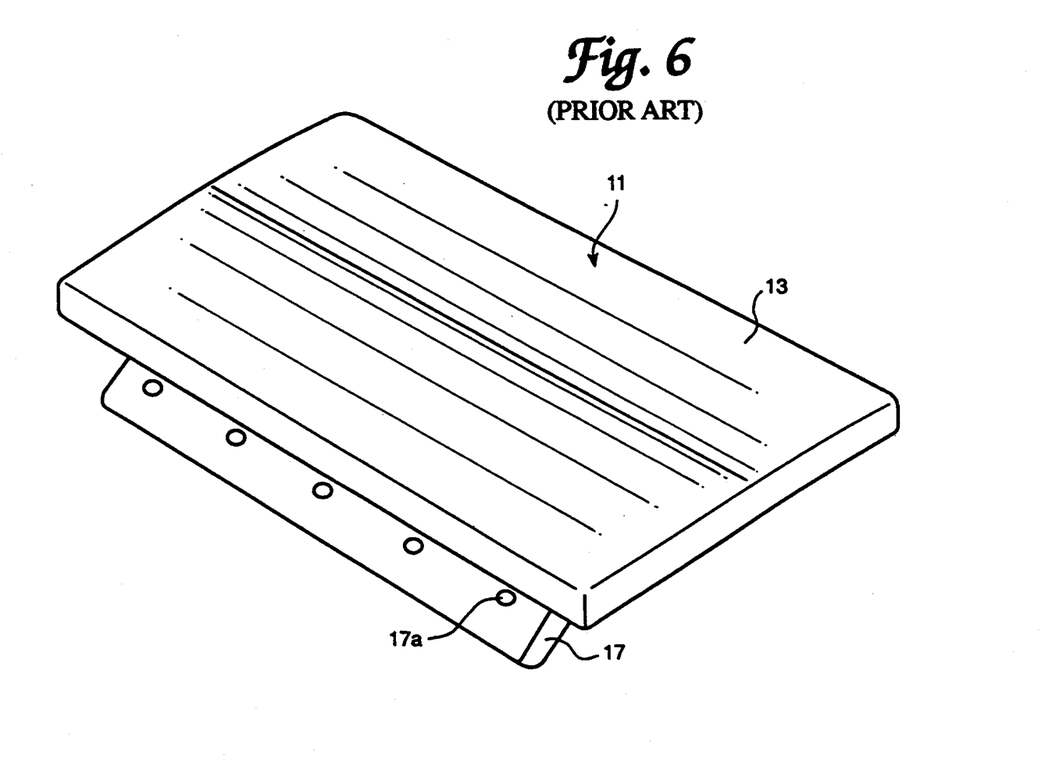
FIG. 6 is a perspective view of the pad shown in FIG. 5.

As shown in FIGS. 5 and 6, a conventional pad 11 is a molded product having a cover portion 13, a hinge portion 15 projecting from the cover portion 13 near one edge thereof, and a bracket portion 17 extending at an angle from the hinge portion 15. The hinge and bracket portions 15 and 17 project from the rear or inner surface of the cover portion 13, i.e. the opposite side of the cover portion 13 with respect to the interior of the automobile. The pad 11 is provided with a flexible reinforcing member 42 which is embedded therein or which is provided thereon and extends from bracket portion 17 to cover portion 13 through the hinge portion 15, as shown in FIG. 5. The member 42 is provided for reinforcing the hinge portion 15 against damage caused by the swift rotation of the cover portion 13 to its open position upon inflation of the air bag 14. The bracket portion 17 has a plurality of holes 17a through which bolts 29 extend from the case 16 to secure the bracket portion 17 and thereby the pad 11 to the case 16.

The pad 11 is molded by, for example, injecting a molding material into the cavity of a mold through a gate, and hardening the material. The gate is usually located adjacent to that portion of the cavity which forms the free edge of the cover portion 13, i.e. the remote edge thereof from the hinge portion 15. The molding material is preferably a thermoplastic elastomer such as polyester or polyolefin, or an elastic high-molecular material such as polyurethane. The flexible reinforcing insert 42 is typically a net formed by weaving polyamide or other fibers, but may alternatively be a flexible woven or non-woven fabric, or a perforated film of the same or similar material.

When the pad is molded, it is necessary to hold the flexible member against displacement or deformation by the molding material flowing in the mold, and particularly against any displacement resulting in its exposure or protrusion from the decorative front or outer surface of the cover portion of the pad. It has, therefore, been necessary to provide the mold with a multiplicity of pins for setting or holding the flexible member in position.

The presence of so many pins is, however, undesirable, since it increases the time required for setting the member in the mold, disables the setting of the member to be automatically accomplished, and complicates the construction of the mold.

Thus, an object of the present invention is to provide an air bag device wherein a cover is easily fixed to an opening of an instrument panel, and is lighter in weight because of a reduction in the number of the composite parts of a hinge.

Another object of the present invention is to provide an air bag device for which a cover opens smoothly, due to non-interfering parts.

It is still a further object of this invention to provide a process for molding a pad for an air bag device which uses only a small number of pins for setting a flexible reinforcing member in position.

This object is attained by providing a process for molding a pad for an air bag device from a molding material injected into the cavity of a mold through a gate, and hardened therein. The pad has a cover portion, a hinge portion projecting from the cover portion near one edge thereof, and a bracket portion extending from the hinge portion at an angle to the cover portion. The pad is also provided with a flexible reinforcing member embedded therein or provided on an inner surface thereof which extends from the bracket portion to the cover portion through the hinge portion. The process comprises setting the member in the mold cavity so that it may be held in position by pins projecting from the mold into that portion of the mold cavity which forms the bracket portion of the pad, and injecting the molding material through the gate connected to that edge of the mold cavity which forms the one edge of the cover portion.

The molding material injected into the mold cavity flows in two directions along the portion of the cavity which forms the cover portion of the pad (hereinafter referred to simply as the "cover-forming portion of the cavity") and along that portion of the cavity which forms the bracket portion of the pad (hereinafter referred to as simply the "bracket-forming portion of the cavity"), pulling the member and forcing it toward the mold surface defining the inner or rear surface of the cover portion of the pad. Therefore, there is no possibility of the member being undesirably deformed, or exposed on the decorative outer or front surface of the cover portion of the pad. Although the molding resin usually has a somewhat greater flow along the cover-forming portion of the cavity than along the bracket-forming portion thereof, there is no possibility of the member being displaced along the cover-forming portion of the cavity, insofar as it is held by the pins in the bracket-forming portion of the cavity.

According to the molding process of the invention, only the pins provided in the bracket-forming portion of the cavity are required for holding the member when the pad is molded. Therefore, the process of this invention requires less pins for holding the member than does the conventional process. Thus, the process of this invention simplifies the work of setting the member in position and makes it easy to carry out the process automatically. The use of less pins also makes the mold simpler to construct. Therefore, the process of this invention can mold a pad for an air bag device at a low cost by reducing the amount of time and labor. A pad made by the process is also provided.

Other objects, features, and characteristics of the present invention, as well as the methods and operation and functions of the related elements of the structure, and to the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
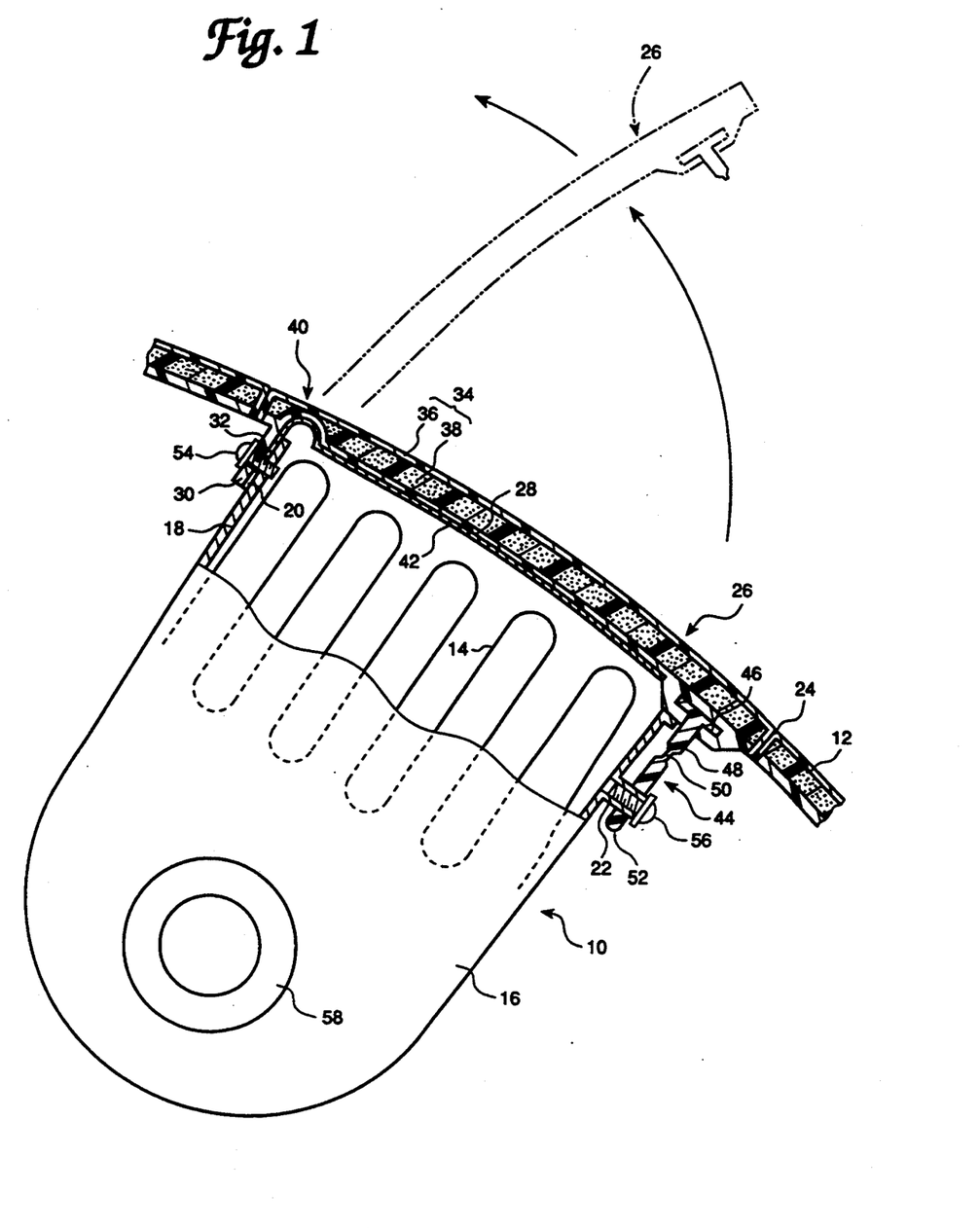
FIG. 1 is a cross-sectional view of an air bag device according to a first embodiment of this invention.

As shown in FIG. 1, an air bag device 10 is equipped in an instrument panel 12, for example on the passenger side of the front seat of a vehicle. A case 16 including an air bag 14 and an inflator 58 is fixed to a body (not shown), and a cover 26 is held at an opening 24 of a surrounding wall 18 of the case 16. The cover 26 includes a base portion 28 and a surface layer 34 and has an "L" shaped cross-section the lower leg of which includes bracket 30.

The base portion 28 is made of TPO (thermoplastic olefin). The base portion may be made of PPF (fiber reinforced polypropylene), polyester, polymer alloy material of PPO (polyphenylene oxide) and polyamide or polyethylene. The surface layer 34 includes an outer skin layer 36 made of TPO and an inner sponge layer 38 made of PP (polypropylene). The skin layer 36 may be made of PVC (polyvinyl chloride) or urethane, and the sponge layer 38 may be made of PVC foam or urethane foams. From an adhesive point of view, when the sponge layer 38 is made PP foam, the material of the base portion is preferably PPF or TPO. When the sponge layer 38 is made of PVC foam, the material of the base portion 28 is preferably polyester.

A hinge 40, which extends the predetermined length of cover 26 and forms a rotation axis for cover 26 when air bag 14 is inflated, is integral with bracket 30 of the cover 26 that extends from the hinge 40 at an angle. The hinge 40 is a semicircular hump of the base portion 28 and a net 42 fits into a space formed by removing at least a portion of the sponge layer 38 at the hinge hump. The net 42 made of polyamide (6 nylon) is partially embedded in the base portion 28. The net 42 reinforces cover 26 throughout as well as hinge 40 and prevents destruction of the hinge when the air bag 14 is inflated. Net 42 also reinforces bracket 30. Bracket 30 also has fixing holes 32.

At least one break-away portion 44 is connected to the cover 26 at the side opposite hinge 40. The break-away portion 44 is made of synthetic resin like a polyester so as to be breakable easier than the material of the base portion 28, and includes a flat flange portion 46 inserted in the base portion 28, a neck portion 48 extending from the flange portion 46, and a fixing portion 52 having a fixing hole. The neck portion 48 has a thin portion 50 in order to be breakable. The break-away portion 44 is made of TPO (Sumitomo TPE 3885). As examples, the tensile strength of the break-away portion 44 is 95 Kg/cm$^2$, and that of the base portion 28 (made of TPO: Sumitomo TPE 3255) is 200 Kg/cm$^2$ by tensile test according to JIS K 6301/No. 2 Dambel 50 mm/min tensile speed.

At the hinge 40, the cover 26 is fixed to the case 16 with screws 54 to the fixing holes 20 of the surrounding wall 18 through the fixing holes 32 of the bracket 30. At the break-away portion 44, the cover 26 is fixed with screws 56 to the fixing portion 22 of the case 16 through the fixing portion 52, and is disposed to close the opening 24.

The cover 26 is produced as follows. The surface layer 34 is vacuum molded to the shape of the cover 26. The surface layer 34 is set with the net 42 and the break-away portion 44 to a mold which molds the base portion 28. The base portion 28 is produced by a stamping mold or injection mold.

The air bag device 10 is installed in the vehicle after the cover 26 is fixed to the case 16 which contains the folded air bag 14 and the inflator 58. In the air bag device 10, the air bag 14 is inflated by the gas from inflator 58, and the break-away portion 44 is broken at the thin portion 50 by the deployment force of the air bag 14, causing cover 26 to open rotationally around hinge 40. As the break-away portion 44 is connected as an member in the synthetic resin cover 26 and is secured in place at the same time as the molding of cover 26, there is no need to use screws to fix the break-away portion 44 to cover 26, and the number of parts can be reduced. Besides, as the break-away portion 44 is made of a material having a strength lower than that of the base portion 28, the break-away portion 44 easily breaks at the time of deployment of the air bag 14. The break-away portion 44 is easily configured and constructed by selecting the material or shape freely.

In the above-described embodiment, cover 26 is fixed to the surrounding wall 18 of case 16; however, hinge 40 of cover 26, and/or the breakaway portion 44 may be connected to the instrument panel 12. FIG. 1 shows the flange portion 46 as having a flat shape; however, the flange portion 46 may be changed to an inverted U-shape or the flat shape may have holes which fill with the material of base portion 28 for tighter connection to the base portion.

Figure 2:
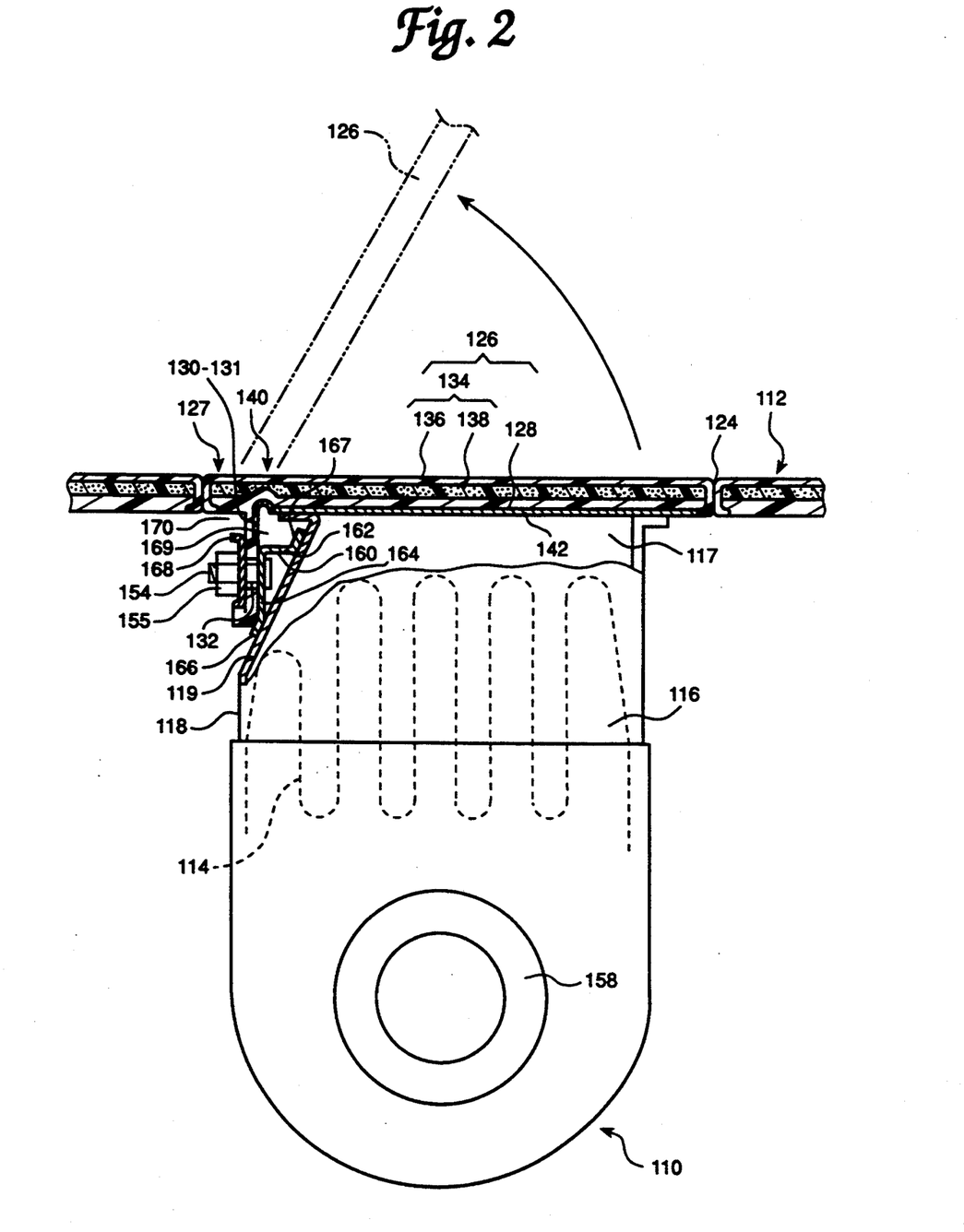
FIG. 2 is a cross-sectional view of an air bag device according to the second embodiment of this invention.
Figure 3:
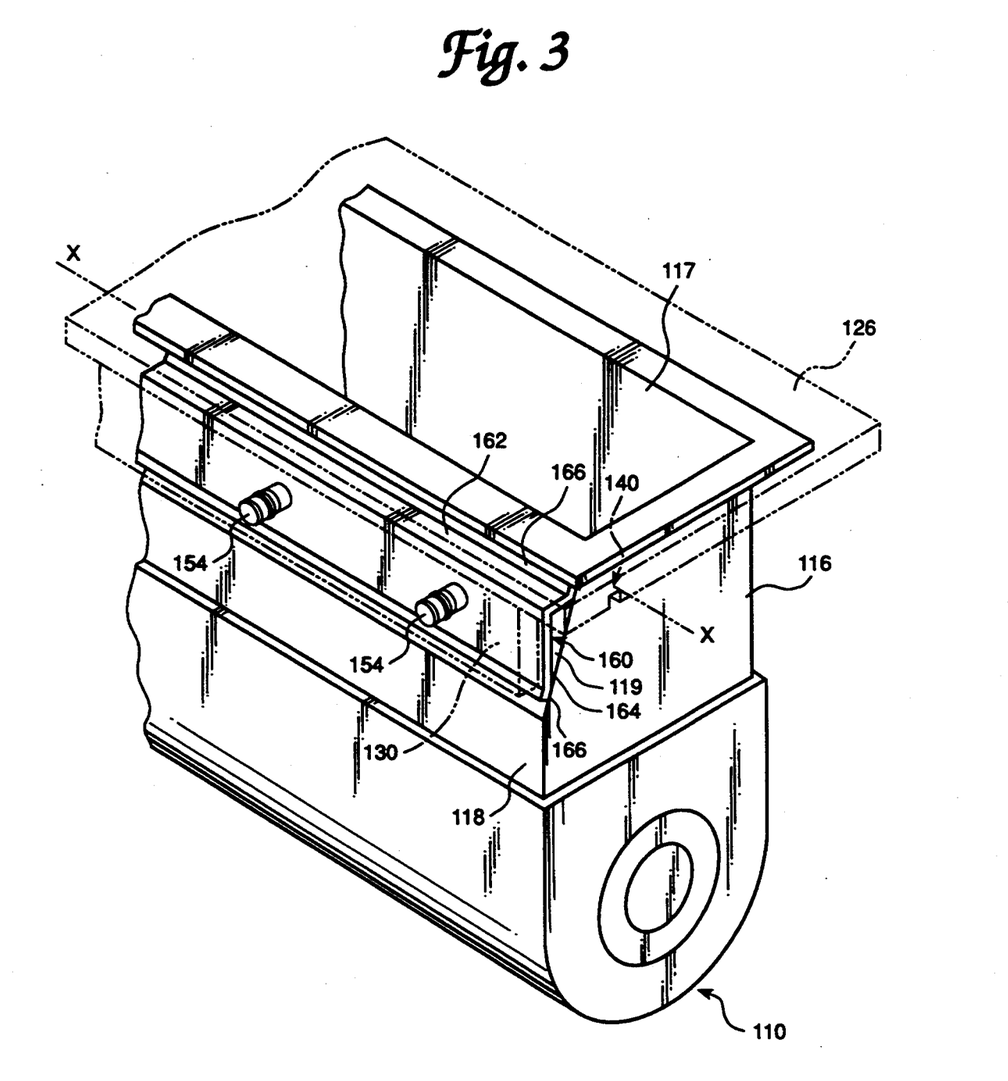
FIG. 3 is a partial perspective view of an air bag device according to the second embodiment of this invention.

As shown in FIGS. 2 and 3, a second embodiment of an air bag device 110, disposed in an upper portion of an instrument panel 112 in front of a passenger, includes a case 116 made of metal and having an inflator 158, and a cover 126 over an opening 117 of the case 116. The cover 126 which is disposed in an opening 124 of the instrument panel 112 has a base portion 128 and a surface layer 134 and has an "L" shaped cross-section, the lower leg of which includes bracket 130.

The surface layer 134 includes an outer skin layer 136 and an inner sponge layer 138 which is bonded to the outer layer 136. At an end portion, cover 126 has a predetermined length hinge 140 which forms a rotation axis for cover 126 when air bag 114 is inflated. Throughout cover 126 has a reinforcing net 142 made of polyamide (6 nylon) embedded in the base portion 128. As shown, cover 126 has an extended portion which extends beyond hinge 140 (to the left in FIG. 2) away from case opening 117.

Bracket 130 extends from hinge 140 at an angle and both are covered by net 142. The bracket 130 has fixing holes 132. Case 116 has a bottom portion having a half columnar shape at the lower portion where an inflator 158 is installed and a rectangular-shaped upper portion having an opening portion 117.

A folded air bag 114 is disposed over the inflator 158. At the bottom, case 116 has a fixing bracket (not shown) by which case 116 is secured to a body (not shown). The case 116 has a slope 119 narrowing the opening 117 at the side wall 118 near the hinge 140, and a channel member 160 made of metal is fixed along the hinge 140 by spot welding or the like. The channel member 160 is "L" shaped in cross-section, having an upper leg 162 and a side leg 164, and legs 162, 164 have respective fin portions 166, 167 welded to the slope 119.

Bolts 154 which pass through the fixing holes 132 are welded to the side leg 164. The cover 126 is connected to the side wall 118 by the bolt 154 and a nut 155 with a fitting plate 168.

Channel member 160 is fixed to the slope 119 so that a space 169 exists between the channel member 160 and the hinge 140.

When the air bag 114 inflates, cover 126 deploys rotationally around hinge 140. If case 116 were allowed to deform, hinge 140 would also deform (bend) and that would prevent cover 126 from opening smoothly. Deformation of case 116 and hinge 140 is prevented, because channel member 160 reinforces slope 119. When air bag 114 inflates, the base portion 131 of bracket 130 deforms (bends backward) and prevents concentration of stress in hinge 140 because of space 169 between the channel member 160 and hinge 140. Therefore, the rotation axis X—X (FIG. 3) of the cover 126 is maintained linear and stable, and the cover 126 can be opened smoothly.

This embodiment shows slope 119 reinforced by channel member 160; however, channel member 160 may be connected to the vertical side wall 118 if there is no slope portion. Since there is a space 170 under the position between the hinge 140 and the edge portion 127, cover 126 would rotate smoothly around hinge 140, due to non-interfering parts.

In accordance with another aspect of the invention, a process is employed for molding a pad for an air bag device as shown at 11 in FIGS. 5 and 6. The pad 11 has already been described in detail, and no repeated description thereof is, therefore, made.

Figure 4:
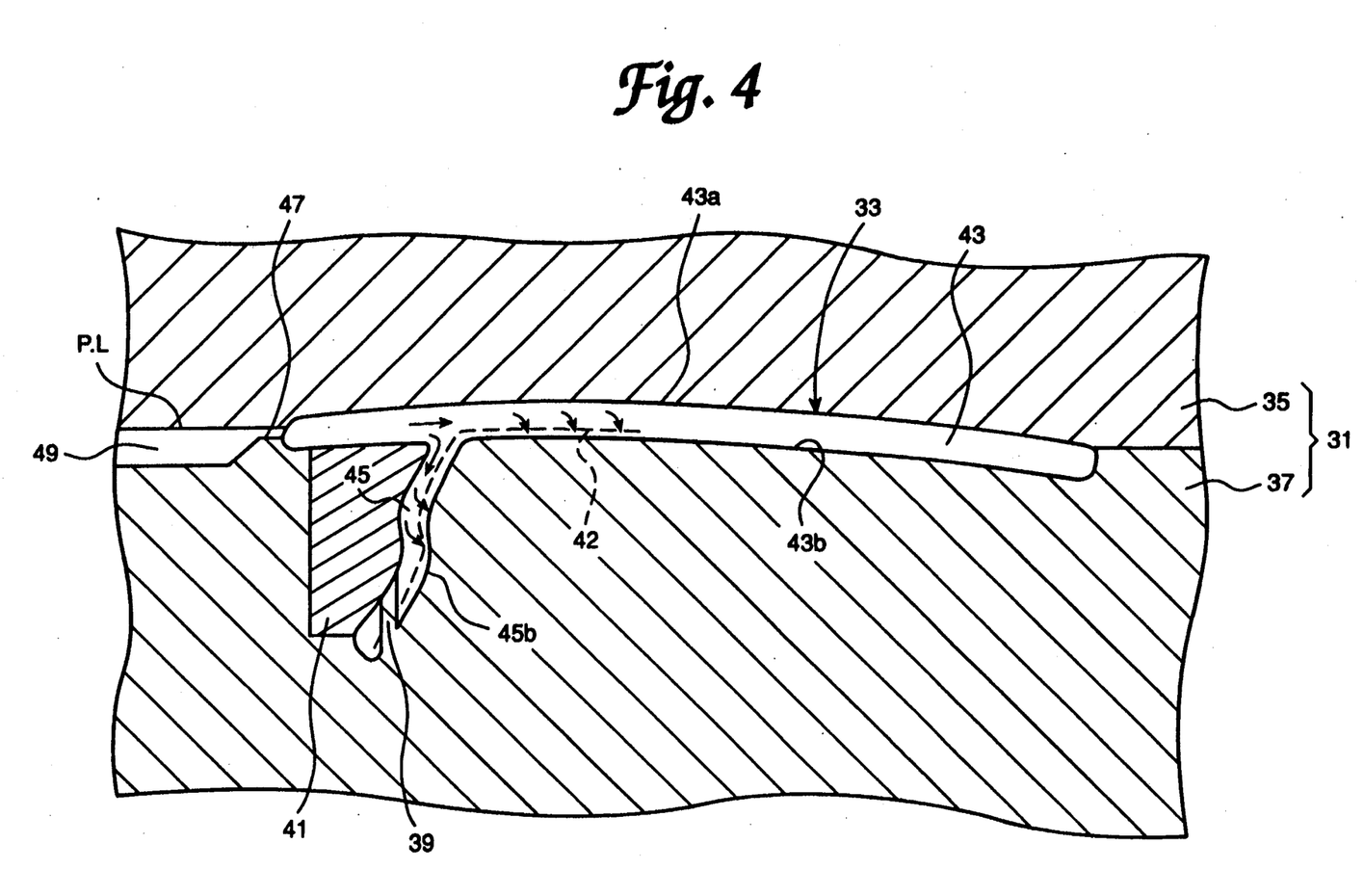
FIG. 4 is a cross-sectional view of a mold in its closed position which can be employed for carrying out a process of the present invention.

The process can be carried out by employing a mold as shown at 31 in FIG. 4, which is usually employed for injection molding. The mold 31 comprises a stationary upper portion 35 and a movable lower portion 37 which defines a mold cavity 33 therebetween when the mold 31 is closed, as shown in FIG. 4. The mold cavity 33 has a cover-forming portion 43 defined between the upper and lower mold portions 35 and 37, and a bracket-forming portion 45 defined between the lower mold portion 37 and a horizontally slidable core 41 fitted in the lower mold portion 37 and removable therefrom to enable the separation of a molded product therefrom. The lower mold portion 37 is provided near the bottom of the bracket-forming cavity portion 45 with a plurality of pins 39 projecting upwardly into the bracket-forming cavity portion 45.

The mold 31 also has a gate 47 defined between the upper and lower portions 35 and 37 thereof and connected to one edge of the cover-forming cavity portion 43 which is closer to the bracket-forming portion 45. The gate 47 is defined beneath a parting line PL between the upper and lower mold portions 35 and 37. A runner 49 is formed between the gate 47 and a sprue (not shown).

Referring now to the molding process of this invention, a flexible reinforcing member 42 is set in position along the lower mold portion 37 when the mold 31 is still in its open position, and when the slidable core 41 in a retracted position. The member 42 may, for example, be a net of synthetic resin fibers, as hereinbefore stated, and held in position by the pins 39 which engage with meshes of the net.

Next, the core 41 is advanced to its position in the lower mold portion 37, and the lower mold portion 37 is moved to close the mold 31, as shown in FIG. 4. A molding material is injected into the mold cavity 33 through the sprue, runner 49, and gate 47, and then hardened to form a pad 11.

There is no possibility of the member 42 being undesirably deformed or wrinkled, or exposed on the decorative outer or front surface of the cover portion 13 of the pad which is formed by the surface 43a of the upper mold portion 35, since the molding material injected into the mold cavity 33 flows in two directions along the cover-forming portion 43 thereof and the bracket-forming portion 45 thereof, as shown by arrows in FIG. 4. Thus, the member 42 is pulled in the two directions and forced toward the surfaces 43b and 45b of the lower mold portion 37. Although the molding material may usually flow with a somewhat greater force along the cover-forming portion 45 thereof, there is no fear of the member 42 being undesirably displaced along the cover-forming portion 43, insofar as it is held by the pins 39 in the bracket-forming portion 45.

Thereafter, the mold 31 is opened, and the pad 11 is removed therefrom. The necessary treatment of the pad is performed, including deburring. The disengagement of the pins 39 from the pad 11 leaves mounting holes 17a.

Although the insert has been described as being held by the pins provided for forming the holes 17a, it is, of course, possible to provide the mold with another set of pins that are used for the exclusive purpose of holding the insert. Although the pins have been described as being provided on the lower mold portion, it is alternatively possible to provide them on the slidable core. The insert does not necessarily need to be a net, but may be another material as hereinbefore stated, and the pins can be used to hold it against the surface of the lower mold portion.

Figure 7:
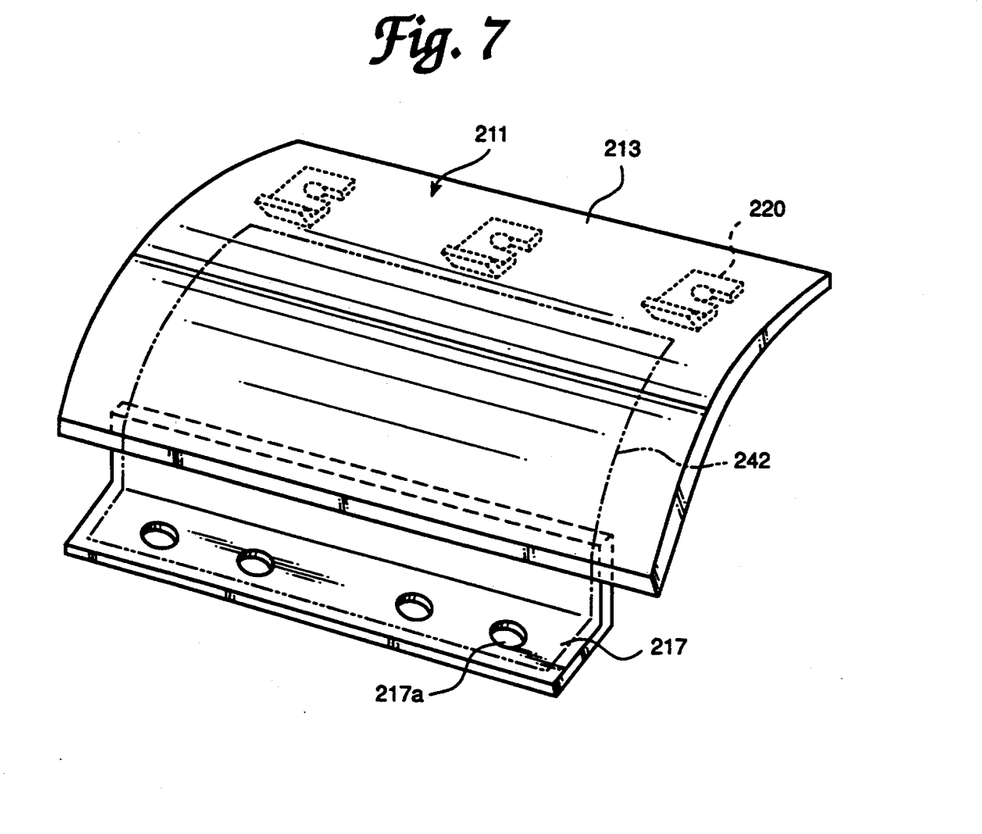
FIG. 7 is a perspective view of a pad for an air bag device molded in accordance with the principles of the present invention.
Figure 8:
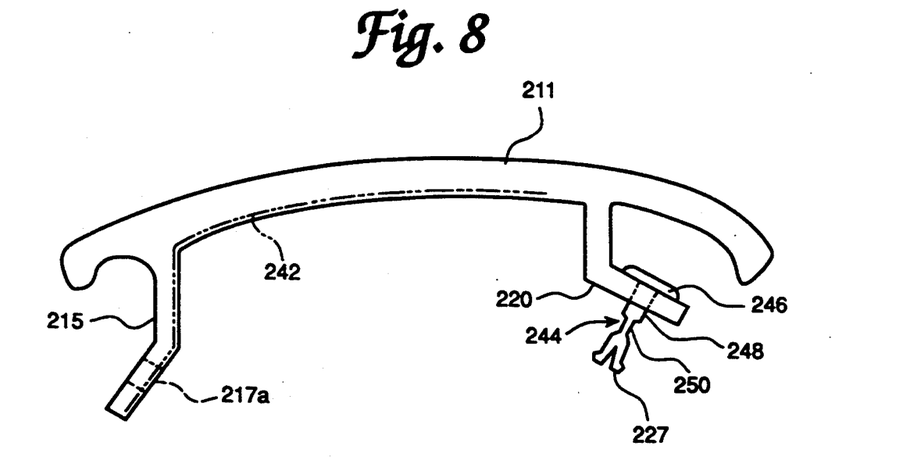
FIG. 8 is a side view of the pad of FIG. 7.

In FIGS. 7 and 8, an embodiment of the molded pad for an air bag device is shown. The pad 211 is similar to pad 11, except pad 211 includes flange portions 220. In the illustrated embodiment, three flange portions 220 are shown. The flange portions 220 are provided opposite the bracket portion 217 extending from a lower surface of the cover portion 213. The flange portion 220 include a bore therethrough for receiving breakaway portions 244. As noted above, the break-away portion 244 is preferably made of synthetic resin, for example, polyester, so as to be easily breakable. The break-away portion includes a flat flange portion 246 and a neck portion 248 extending from the flat flange portion. The neck portion has a thin portion 250 in order to be breakable. The neck portion 248 has a flared end 227. The pad 211 also includes a flexible reinforcing insert member 242 and mounting holes 217a.

Figure 9:
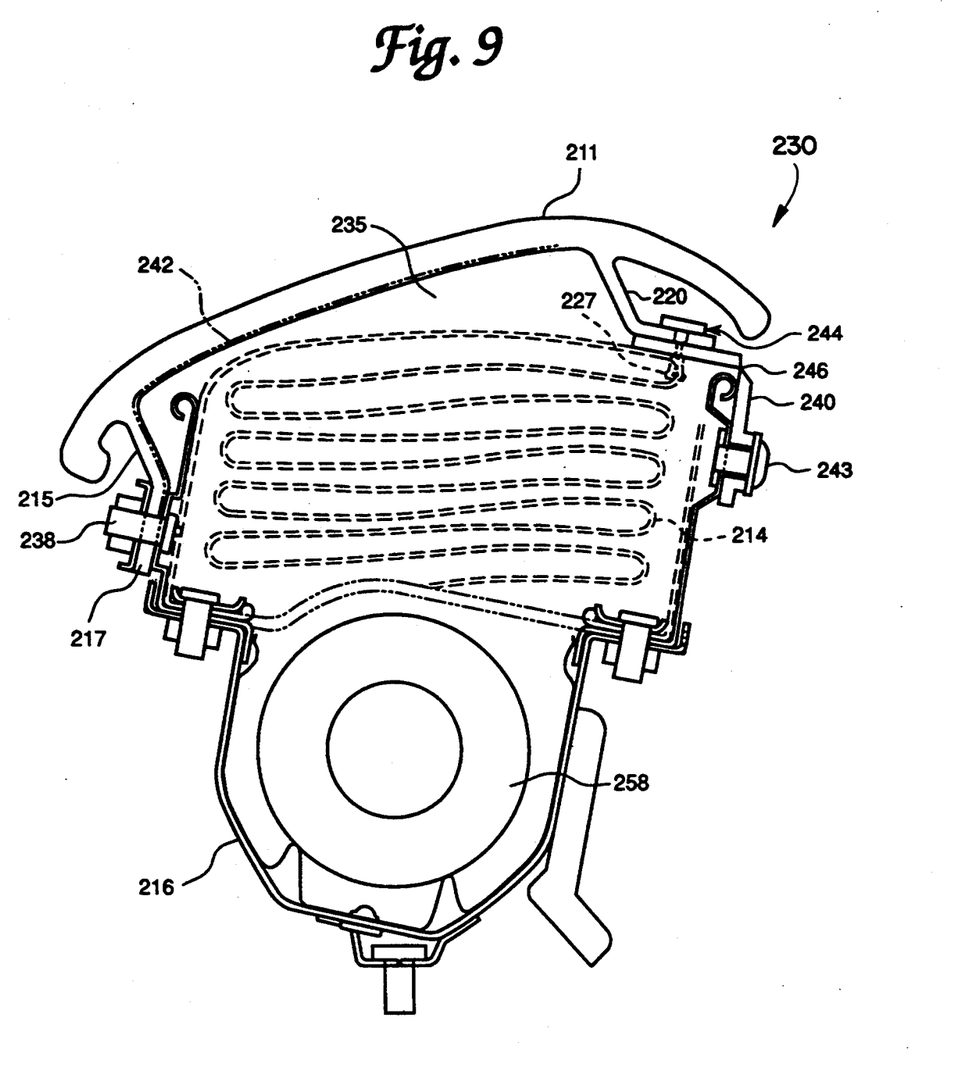
FIG. 9 is a schematic elevation view of an air bag device using the pad of FIG. 7.

FIG. 9 shows the pad 211 employed in an air bag device 230 for use on the passenger side of the front seat of a vehicle. A case 216 including an air bag 214 and an inflator 258 is fixed to a body (not shown). The air bag 214 is disposed in opening 235 in a folded condition. Pad 211 closes opening 235.

A hinge portion 215 forms a rotation axis for the pad 211 when the air bag 214 is inflated. The hinge portion 215 is integral with bracket portion 217. The bracket portion 217 is fixed to the case 216 with fasteners 238. The insert member 242 reinforces the pad 211 as well as the hinge portion 215, thus preventing destruction of the hinge when the air bag is inflated. Insert member 242 also reinforces bracket 217.

The flange portions 220 are disposed on an upper surface bracket 240. The break-away portions 244 in the form of a pin member 245 are inserted into bores in the flange portion 220 and bracket 240. Flared end 227 of the break-away portion secures the break-away portion to bracket 240. Bracket 240 is secured to the casing 216 by fasteners 243.

With reference to FIG. 9, instead of providing the break-away portions 244 in the form of pin members 245, the pin members may be securely fastened to the flange portion 220 and bracket 240, with the break-away portion being a thin corner portion 246 of the bracket 240.

The air bag device 230 is installed in the vehicle after the pad 211 is fixed to the case 216 which contains the folded air bag 214 and inflator 258. The air bag device 230 is deployed by gas from inflator 258, which causes the bag 214 to expand, thus breaking the thin portion 250 of the break-away portion 244. Thus, pad 211 rotates about hinge portion 215, permitting the air bag 214 to fully inflate through opening 235.

While the invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. A process for molding a pad for an air bag device, said pad having a cover portion, a hinge portion disposed between two opposing edges of the cover portion and nearer to one edge thereof, and a bracket portion extending from said hinge portion, said pad being provided with a flexible reinforcing member extending from said bracket portion to said cover portion through said hinge portion, the process comprising the steps of:
   setting said reinforcing member in a mold while said mold is open so that said reinforcing member is held in position by pins projecting from said mold into a portion of said pad;
   closing said mold;
   injecting molding material into said cavity through a gate, said gate being provided at an end portion of said cover portion, said end portion being defined between the hinge portion and the edge near the hinge portion so that said gate is connected to an edge of said cavity which forms said one edge of said cover portion of said pad.

2. A process as set forth in claim 1, wherein said pins project from a portion of said mold which is movable to and away from a stationary portion of said mold.

3. A process as set forth in claim 1, wherein said reinforcing member is a net made of synthetic resin fibers.

4. A process as set forth in claim 1, wherein the reinforcing member includes a bent portion, the bent portion being forced toward surfaces of the mold by the molding material flowing from the gate.

5. The process as set forth in claim 1, wherein said cover portion is made from thermoplastic olefin.

* * * * *